United States Patent [19]
Zamagni

[11] Patent Number: 5,762,153
[45] Date of Patent: Jun. 9, 1998

[54] MACHINE FOR ARTHROPOD LOCOMOTION ON A SURFACE

[76] Inventor: Giancarlo Zamagni, Via Lotti N. 6, 47037 Rimini, Italy

[21] Appl. No.: 556,304

[22] Filed: Nov. 13, 1995

[30] Foreign Application Priority Data

Dec. 22, 1994 [IT] Italy .................. B094A0568

[51] Int. Cl.$^6$ .................................................. B25J 3/04
[52] U.S. Cl. .................................................. 180/8.6; 901/1
[58] Field of Search .................. 180/8.1, 8.6, 8.5; 280/1.181, 218; 901/1

[56] References Cited

U.S. PATENT DOCUMENTS

| | | | |
|---|---|---|---|
| 3,135,345 | 6/1964 | Scruggs | 280/1.181 |
| 4,662,465 | 5/1987 | Stewart | 180/8.1 |
| 5,040,626 | 8/1991 | Paynter | 180/8.1 |
| 5,124,918 | 6/1992 | Beer et al. | 901/1 |
| 5,219,410 | 6/1993 | Garrec | 180/8.1 |
| 5,484,031 | 1/1996 | Koyachi et al. | 180/8.1 |

FOREIGN PATENT DOCUMENTS 60-104474  6/1985  Japan .................. 180/8.1

*Primary Examiner*—Robert J. Oberleitner
*Assistant Examiner*—Avraham Lerner
*Attorney, Agent, or Firm*—Dvorak & Orum

[57] ABSTRACT

A machine for arthropod locomotion on a surface includes a bearing structure supported by six limbs centrally and spherically hinged on a sliding block which is mounted on a longitudinal slideway of the structure. Each limb has a free end capable of interacting with the surface and an opposite end mounted to the machine, and where each limb is rotationally and slidably mounted with respect to a respective limb vertical axis. The machine includes a motor on the constrained ends, and a motor on the sliding blocks of the slideway, each being interfaced with a control system that creates an interaction between motors so as to lift and forwardly rotate three limbs alternatively placed on two sides of the machine, while the remaining three limbs which are supporting the machine on the surface, are correspondingly rotated in an opposite direction.

12 Claims, 4 Drawing Sheets

MACHINE FOR ARTHROPOD LOCOMOTION ON A SURFACE

BACKGROUND OF THE INVENTION

The invention relates to a machine for arthropod locomotion on a surface, particularly suitable for moving on uneven or rough surfaces.

Currently studies are being made on deambulating robots whose current moving direction is inspired by the way in which insects or animals walk. The interest in such machines is due to the fact that they can move easily on very rough surfaces, being difficult to do so by using traditional locomotion means. The invention concerns locomotion machines capable of climbing stairs, or of passing over incoherent ground, or of moving easily in the presence of tubes or obstacles of various nature.

SUMMARY OF THE INVENTION

The aim of the invention, as characterized in the appended claims, is that to resolve the kinematic problems concerning the mechanics of the arthropod deambulation by making available a machine equipped with six limbs, which limbs are connected to a bearing central structure of the machine, said esapode machine having a development which is mostly longitudinal.

Each of the six limbs of the machine is centrally and spherically hinged onto sliding blocks which are mounted onto a longitudinal slideway supported by the same structure; each limb has a free end so as to interact with the supporting surface of the machine, and an opposite end rotatably and slidably constrained to the machine with respect to a vertical axis.

The machine is equipped with motorization means which are placed on the constrained ends of the limbs. The activation of said means allows the lifting and the lowering of the free ends of each limb with respect to the surface; said machine is also fitted with motorization means of the sliding blocks of the slideway. The activation of said means allows the rotation of each limb about the axis carrying each limb backwards and forwards with respect to the structure.

Control means, interfaced with the motorization means of the constrained ends of the limbs and with the motorization means of the sliding blocks, are provided for the interaction of said motorization means in such a way so as to lift and forwardly rotate three limbs alternatively placed on the two sides of the machine, while the remaining three limbs, sustaining the machine on the surface, are correspondingly backwardly rotated, and vice versa, allowing in this way the advancement of the machine.

The invention reaches said aim by means of a machine in which the complex function of deambulation is achieved by the combination of elementary kinematic functions carried out by independent mechanisms, of simple construction, of safe and reliable functioning, and of a low cost, said independent mechanisms becoming easy to control by the control means of the machine.

BRIEF DESCRIPTION OF THE DRAWINGS

Further characteristics and advantages of the invention will better emerge from the detailed description that follows, made with reference to the accompanying drawings, of a preferred embodiment here illustrated in the form of a non-limiting example in which.

DESCRIPTION OF THE PREFERRED EMBODIMENTS

Figure 1:
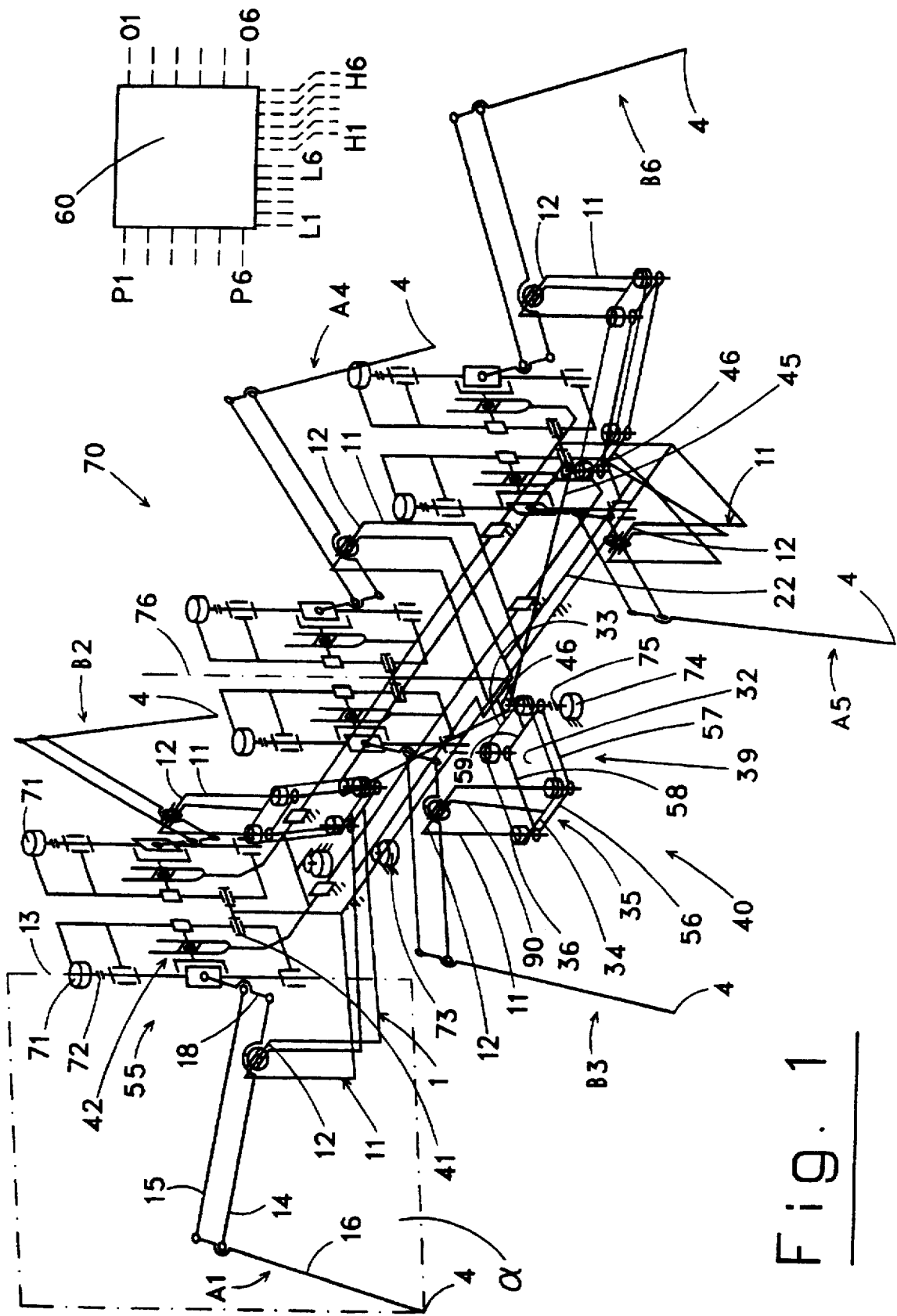
FIG. 1 is a perspective view of a whole machine in accordance with the invention.
Figure 2:
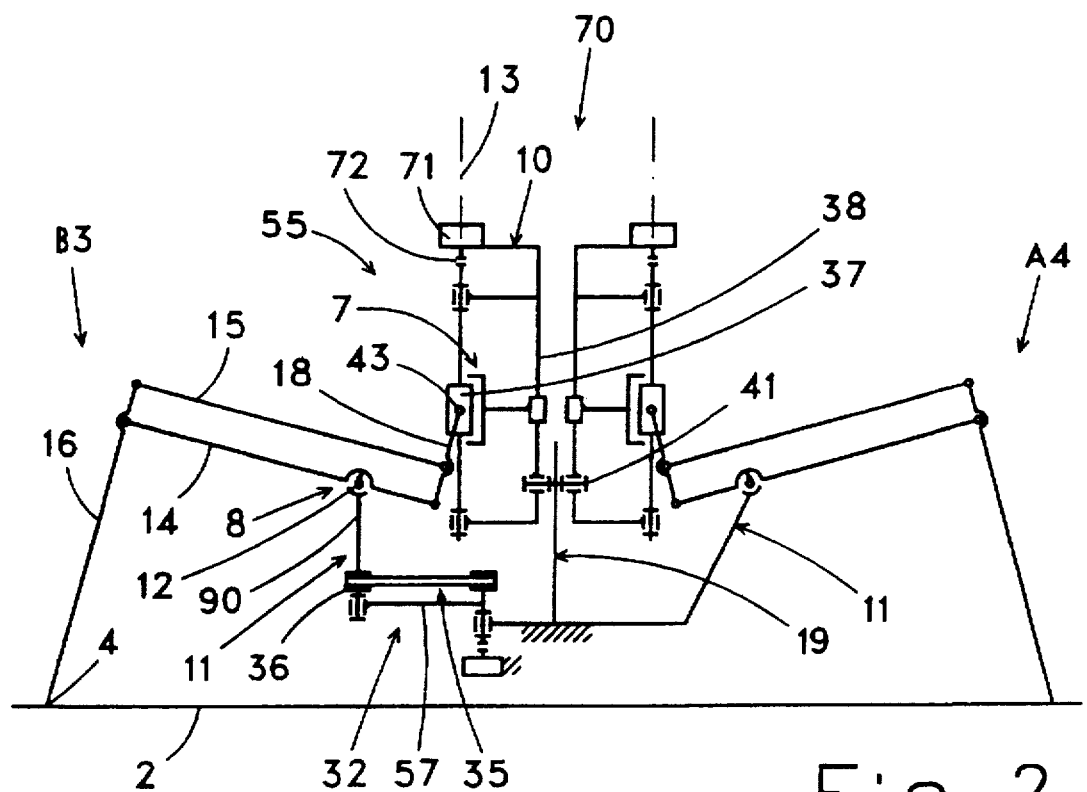
FIG. 2 is a view in elevation of the couple of central limbs of the machine of FIG. 1.
Figure 3:
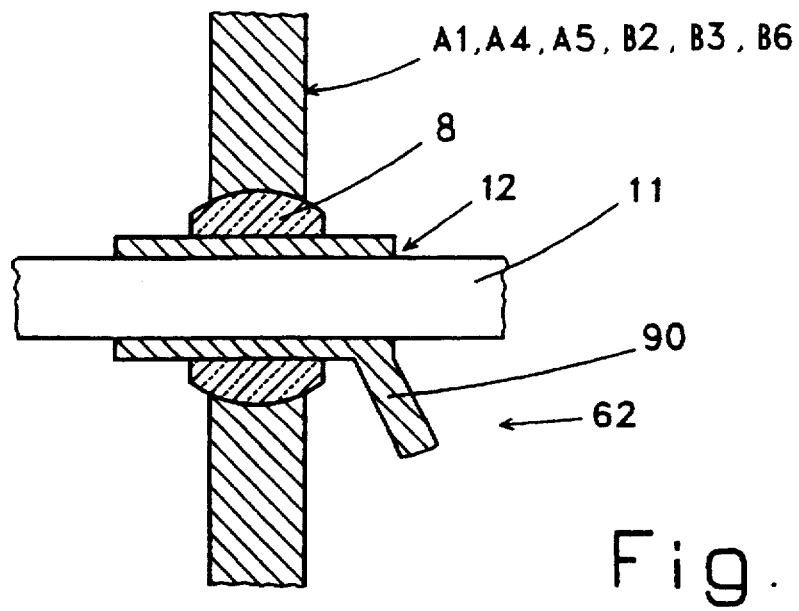
FIG. 3 is a sectional view, on an enlarged scale, of a particular concerning the articulation of the limbs of the machine.
Figure 4:
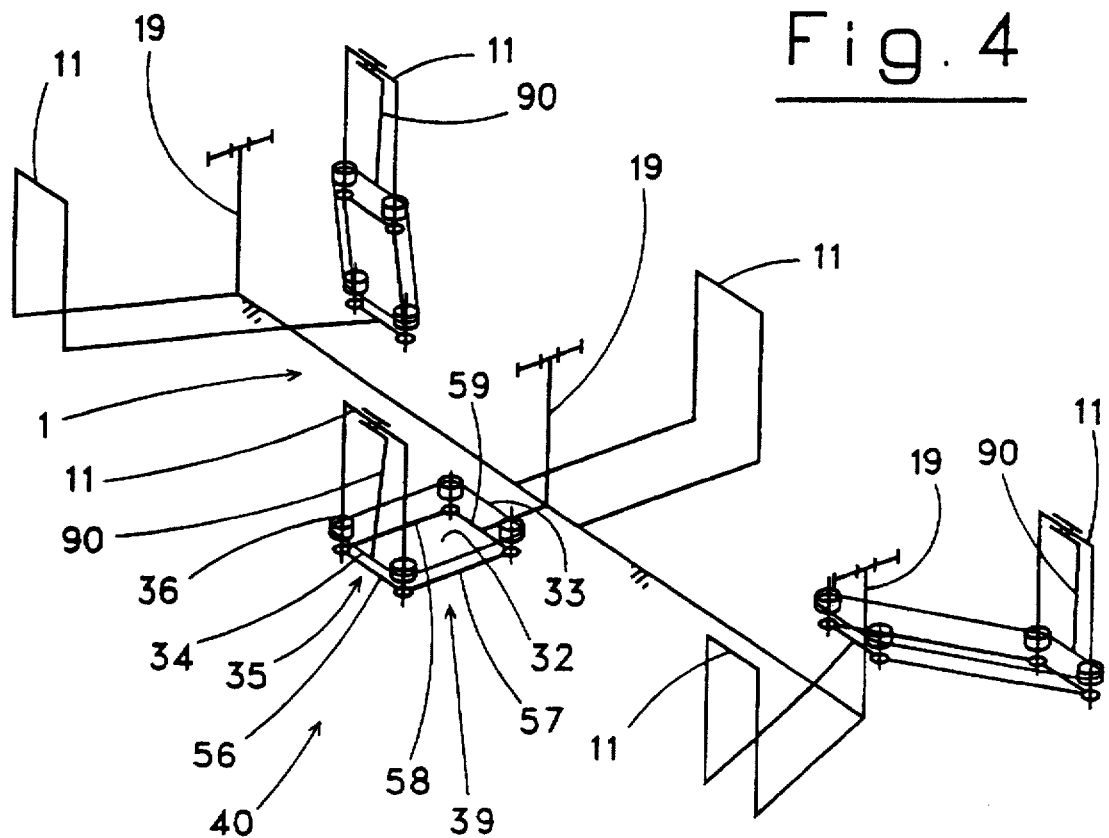
FIG. 4 is a perspective view emphasizing that at least two of the lateral supports are directly connected to the bearing structure.

With reference to FIG. 1, it can be noted that the invention substantially consists of a machine (70) for arthropod locomotion on a surface (2) comprising a longitudinal bearing structure (1) (FIGS. 1–4) constituted by a central longitudinal member (19); on both sides of said structure (1) are disposed six limbs, two of which are frontal (A1,B2), two of which are central (B3,A4) and two of which are rear (A5,B6) for the support of the machine (70) on the surface (2).

Each limb (A1,B2,B3,A4,A5,B6) is centrally and spherically hinged onto a sliding block (8) (FIG. 1–3), which is mounted onto a longitudinal slideway (12) sustained by lateral supports (11) of the structure (1). Each limb has a free end (4) capable of interacting with the supporting surface (2) of the machine (70), and an opposite end (43) rotatably and slidably constrained to the machine (70) with respect to a vertical axis (13).

The limbs (A1,B2,B3,A4,A5,B6) (FIG. 2) include elements (14,15,16,18) which are connected as a four-bar linkage, reciprocally articulated so as to be mobile on a plane (a) passing through said axis (13), said limbs are centrally hinged onto the bearing structure (1) in such positions so as to amplify, on the free ends (4), the movements received on their opposite constrained ends (43).

The machine (70) comprises motorization means (55) coupled to the constrained ends (43), the activation of said means permits the lifting and the lowering of the free ends (4) of each limb (A1,B2,B3,A4,A5,B6) with respect to the surface (2), adapting to the planimetric variations of the ground.

In particular (FIG. 2), such motorization means (55) include, for each limb (A1,B2,B3,A4,A5,B6), a support (7) on which the element (18) (connecting rod) is rotatingly mounted with its opposite end (43), and a vertical frame (10) constrained to the structure (1) of the longitudinal member (19).

The support (7) is slidingly mounted onto the guide (38) on the frame (10); for this reason said support is preferably coupled with a dragging element (37) which is elicoidally coupled with a motorized screw (6) in turn supported by the frame (10) itself.

On the activation of the motor (71), connected to the motorized screw (6) by means of a joint (72), the support (7) results bi-directionally mobile along the frame (10), correspondingly determining the lifting and the lowering of the relative limbs (A1,B2,B3,A4,A5,B6) with respect to the surface (2).

The machine (70) also includes motorization means (62) coupled to the sliding blocks (8) of the slideway (12) in such a way as to rotate each limb (A1,B2,B3,A4,A5,B6) about the vertical axis (13) in such a way as to make said limb mobile between two extreme positions respectively advancing and receding with respect to the structure (1).

Figure 5:
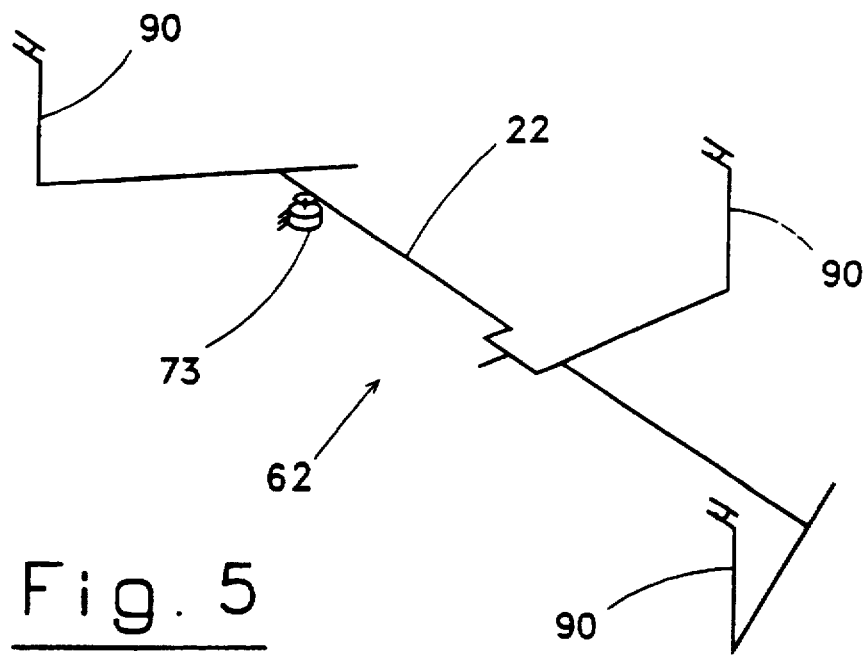
FIG. 5 is a perspective view of the feed frame.

Said motorization means (62) of the sliding blocks (8) of the slideway (12) include a feed frame (22) (FIG. 5), having operating arms (90), of the sliding blocks (8). The frame (22) includes the direct connection of the arms (90) to the sliding blocks (8) of a first group of three limbs (A1,A4,A5) placed alternatively on the two sides of the machine (70), and the indirect connection to the sliding blocks (8) of the slideway (12) of a second group comprising the remaining three limbs (B2,B3,B6). Said indirect connection is carried out by means of interposed reversing mechanisms (39) which will be explained in the description that follows.

The feed frame (22) is slidingly mounted onto the bearing structure (1), and is motorized by a single motor (73) in such a way as to result alternatively translatable, longitudinally to the machine (70), thus determining the advancing of three limbs (A1,A4,A5), whose sliding blocks (8) are directly connected to the feed frame (22), and correspondingly making the three remaining limbs, (B2,B3,B6) which are indirectly connected to the feed frame (22), recede, and vice versa.

The machine (70) includes, control means (60) interfaced with the motorization means (55) of the constrained ends (43) of the limbs (A1,B2,B3,A4,A5,B6), and with the motorization means (62) of the sliding blocks (8) in such a way as to make said limbs (A1,B2,B3,A4,A5,B6) interact determining the advancing or the receding of the machine (70) on the surface (2).

Said advancement, in fact, takes place with the lifting and the forward rotation of three limbs (A1,A4,A5) alternatively placed on two sides of the machine, while the remaining three limbs (B2,B3,B6), by taking hold on the supporting surface (2), sustain the machine (70) and guarantee the stability thereof by being correspondingly rotated backwards to make the machine advance and vice versa.

As can be noted in FIG. 1, all the limbs (A1,B2,B3,A4, A5,B6) are provided with their own independent motor (71) for lifting and lowering the machine, permitting a better adaptability of the machine to the planimetric variations of the ground.

The reversing mechanisms (39), necessary for the forward movement of the machine (70), are preferably made as shown in FIG. 1. Said mechanisms comprise a support (32) shaped as a four-bar linkage sustained by the bearing structure (1) (FIG. 2) and sustaining in turn the support (11) of the sliding block (8) (in figure represented as a portal). The four-bar linkage supports (32) comprise elements (56,57,58, 59) reciprocally articulated so as to be parallelly mobile to the supporting surface (2) of the machine (70), for reasons that will be further described, and however do not affect the advancing of the machine (70) itself. Each support (32) shaped as a four-bar linkage sustains four idle pulleys (36), splined on the top, about which a flexible element, for example a chain, is ringwound. A first branch (33) of the flexible element (35), adjacent to the longitudinal member (19) is connected to the feed frame (22), while a second opposite branch (34) moves an operating arm (90) of the sliding block (8) sustained by the support (11). Thanks to such connections, in correspondence with the activation of the forward movement of the feed frame (22), while the four-bar linkage support (32) is maintained in its resting condition, the rotation of the flexible element (35) is determined with the consequent movement, in the opposite direction, of the limbs (B2,B3,B6) which are connected to said flexible element (35). To be precise, while the three limbs (A1,A4,A5), which are directly connected to the feed frame (22), are forwardly moved, the sliding blocks (8), which are indirectly connected, are backwardly moved, causing the consequent reversal of the relative three limbs (B2,B3,B6), and vice versa, when the movement of the feed frame (22) is reversed.

Preferably the machine (70) is also equipped with actuator means (40) which allow for the rotation of the machine on the surface (2). Said actuator means (40), for simplicity, are only applied, as before, to a triad of limbs (B2,B3,B6) placed alternatively on the two sides of the machine (70). Said actuator means (40) function in phase synchronism with the motorization means (55) which in turn allow the lifting and the lowering of the limbs (A1,B2,B3,A4,A5,B6) in such a way as to intervene, in the appropriate moment, transmitting to the limbs (B2,B3,B6), the same rotation about the respective vertical axes (13), while the remaining three limbs (A1,A4,A5,) are maintained raised from the surface (2) and vice versa.

Advantageously, said actuator means (40) for rotation use the same four-bar linkage supports (32) mentioned above, which in the case of rotation make use of the possibility of movement due to the fact that the elements (56,57,58,59) are reciprocally articulated.

More specifically (FIG. 1), the four-bar linkage supports (32) comprise the driving element (56) (connecting rod) which is interconnected to the elements (57,58) with equalizing functions, one of which is motorized by a motor (74), which in turn is provided with a conventional clutch (75). When the motor (74) is activated, by means of the engagement of the clutch (75), the element (56) with connecting rod functions translates, and by correspondingly moving the portal support (11), pulls into rotation the whole articulation of the limb (B3) about a barycentric vertical axis (76) of the machine (70).

Similar four-bar linkage supports (32) are provided for the remaining two limbs (B2,B6) destined for the rotation, whose respective elements (57), that are driving elements, are moved in phase synchronism in such a way so as to determine the simultaneous rotation of the whole machine (70) about said axis (76).

Figure 7:
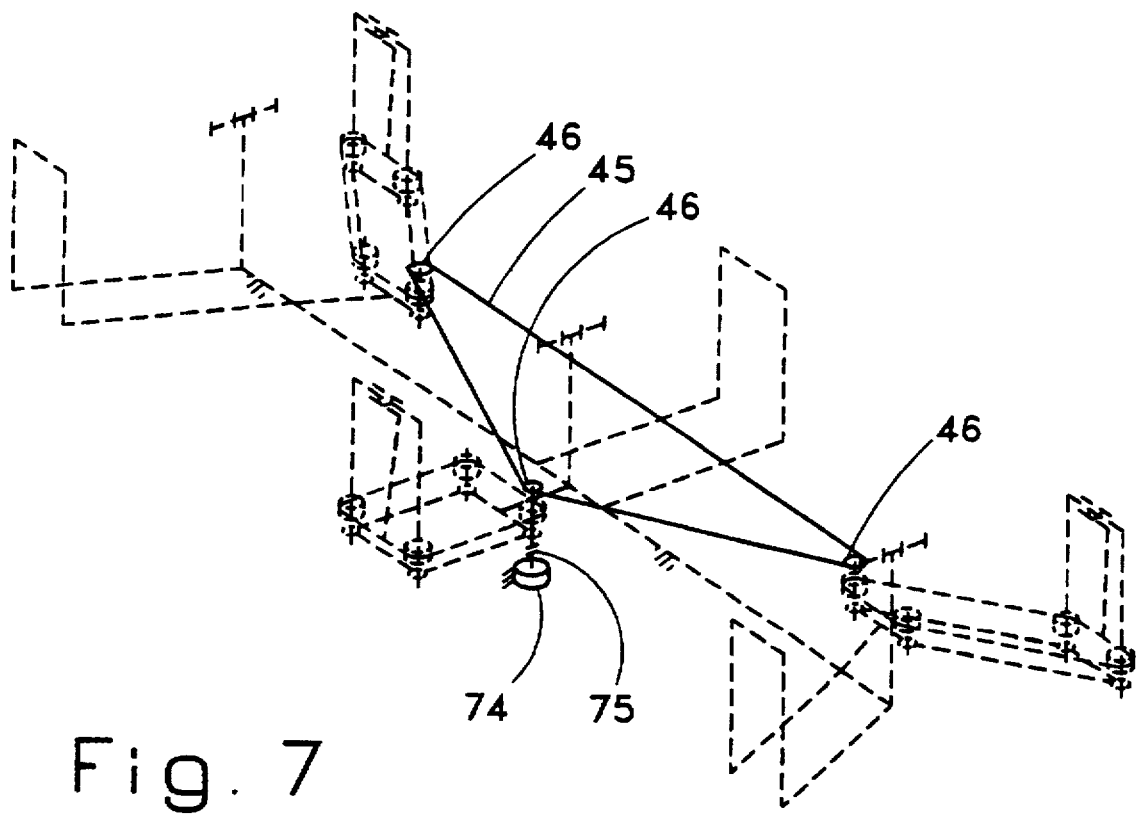
FIG. 7 is a perspective view emphasizing the ringwound element in relation to causing simultaneous movement of each actuator means.

Preferably the actuator means (40) of the rotation include a single motor (74) fixed to one of the elements (57)with the functions of an rocking arm of a four-bar linkage support (32). In such case the actuator means (40) (FIG. 7) include a motorized flexible element (45) (constituted for example by a chain) ringwound about motorization pulleys (46) of the remaining four-bar linkage supports (32) which pulleys are pulled into rotation in correspondence with the clutch (75).

As said, the frames (10) are fixed to the bearing structure (1) of the machine (70), however, by observing FIG. 1, it can be seen that, preferably, said frames (10) are mounted onto the bearing structure (1) in such a way as to revolve about the axes (41), which are parallel to the supporting surfaces (2) of the machine (70), and revolvingly connecting to a motorized frame (30) which controls collectively the inclination of the limbs (A1,B2,B3,A4,A5,B6).

Figure 6:
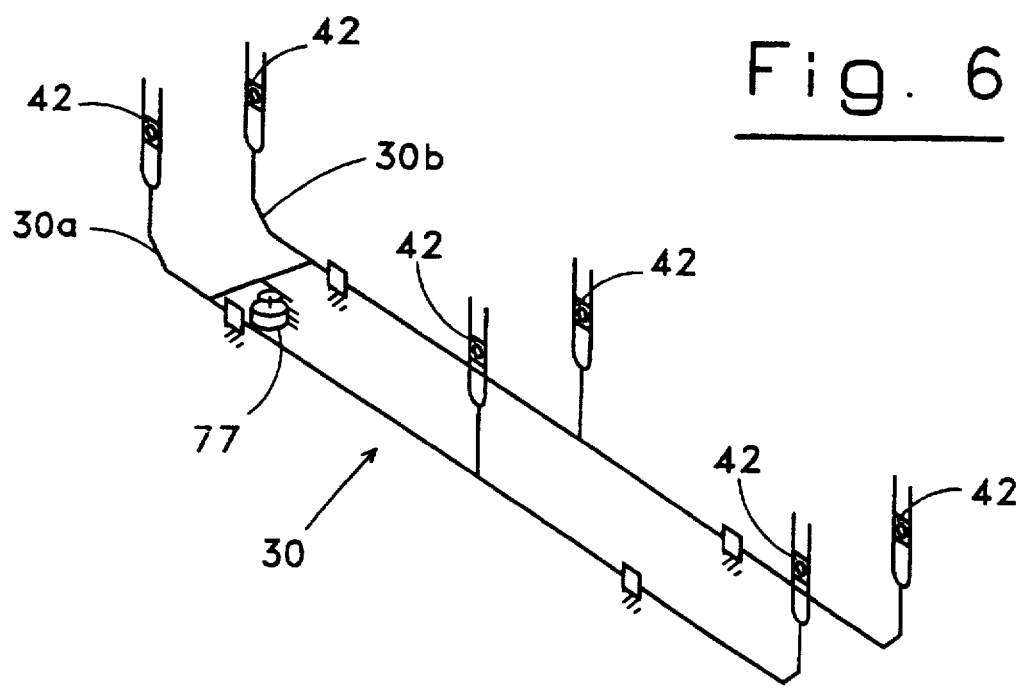
FIG. 6 is a perspective of the longitudinal slideway.

Said frame (30) for the control of the inclination (FIG. 6) is slidably mounted onto the bearing structure, (1) so as to result alternatively and longitudinally mobile with respect to said bearing structure (1), in such a way as to make the frames (10) oscillate about the relative axes (41), thus correspondingly inclinating all of the limbs (A1,B2,B3,A4, A5,B6) with respect to the structure (1). Said inclination permit the machine (70) to move on inclined surfaces (2) maintaining the limbs (A1,B2,B3,A4,A5,B6) substantially vertical, thus making possible a better control of the overall stability of the machine (70).

Preferably the frame (30) is made of two parts (30a,30b) and is provided with an operating motor (77). Said frame is connected to the lifting and lowering frames (10) by means of links (42) for reciprocal connection.

Finally, the machine (70) includes a series of sensors which can be interfaced with the control means (60) including at least for each limb (A1,B2,B3,A4,A5,B6), at least one sensor (P1,P2,P3,P4,P5,P6) for contact made on the surface (2); at least one sensor (O1,O2,O3,O4,O5,O6) initially activates the lifting of the respective limb (A1,B2,B3,A4,A5,B6). Only in the case in which the simple lifting is not sufficient, the control means (60) would make the machine (40) rotate on itself. In addition are provided two sensors (H1,H2,H3, H4,H5,H6,L1,L2,L3,L4,L5,L6) so as to signal the ends of the vertical run of each limb (A1,B2,B3,A4,A5,B6).

Further sensors, not represented, can be placed so as to control all the movements of the machine (70). In particular it is to be noted that the independence of all the movements of the machine (70) allows the adoption of sensors constituted by push button electric switches which advantageously permit, together with the various actuator motors, to make a control sensing unit which can be managed as in the case of biological animal reflexes, thus simplifying, in a significant way, the software which is at the base of the control means (60) of the machine (70).

The present invention is susceptible to numerous variations or changes without falling outside the scope of the invention. Furthermore, all details can be replaced by technically equivalent elements.

Obviously, in actual practice, it is possible to make variations and/or improve the present invention without falling outside the field of the following claims.

What is claimed:

1. A machine for arthropod locomotion on a surface, said machine having a longitudinal axis and forward and rearward ends, said machine comprising:

a bearing structure generally disposed along said longitudinal axis and having a pair of sides;

at least six limbs for supporting the structure on the surface, each limb having a free end and a constrained end, each limb centrally and spherically hinged on a respective sliding block, each respective sliding block mounted on a respective longitudinal slideway that is supported by the bearing structure, each slideway supported by a pair of longitudinally spaced supports, wherein at least three of said lateral supports from three of said slideways are directly connected to said bearing structure, wherein said free end of each limb is capable of interacting with the surface, and each constrained end is rotatable and slidable with respect to the machine along a respective limb vertical axis;

motorization means coupled to each of said constrained limb ends for lifting and lowering the free ends of each said limb with respect to the surface;

motorization means coupled with the sliding blocks of each said slideway so as to respectively rotate each limb about said limb vertical axis and to move said limb between a longitudinally advanced and receded position with respect to the structure, a forward rotation of said sliding block motorization means and limb corresponding to limb movement toward said forward end of said machine and a backward rotation of said sliding block motorization means and limb corresponding to a limb movement toward said rearward end of said machine;

control means interfaced with each of said motorization means of the respective constrained ends of the limbs and with said respective motorization means of the sliding blocks, said control means causing said limbs to interact with each other, thereby controlling an advancing of the machine on the surface, said advancing occurring with the lifting and the forward rotation of three limbs alternatively placed on the two sides of the machine, while the remaining three limbs sustain the machine on the surface while being simultaneously rotated backwards with respect to the machine.

2. The machine of claim 1, wherein three of said supports are directly fixed to said bearing structure and three are indirectly fixed to said bearing structure.

3. A machine for arthropod locomotion on a surface, said machine having a longitudinal axis and forward and rearward ends, said machine comprising:

a bearing structure generally disposed along said longitudinal axis and having a pair of sides;

at least six limbs for supporting the structure on the surface, each limb having a free end and a constrained end, each constrained end centrally and spherically hinged on a respective sliding block, each respective sliding block mounted on a respective longitudinal slideway supported by said structure, wherein each free end is capable of interacting with the surface, and each constrained end is rotatable and slidable with respect to the machine along a respective limb vertical axis;

motorization means coupled to each of said constrained limb ends for lifting and lowering the free ends of each said limbs with respect to the surface, wherein each of said limbs is comprised of a four-bar linkage having articulated elements movable along a plane passing through said respective vertical axis, one element of each respective linkage representing a connecting rod, and wherein said motorization means includes a vertical frame constrained to said structure, said vertical frame including a support slidably mounted thereto, with an end of said connecting rod rotatably mounted to said slidable support, whereby the lifting and lowering of the respective limb is controlled by movement of said support;

motorization means coupled with the sliding blocks of each said slideway so as to respectively rotate each limb about said limb vertical axis and to move said limb between a longitudinally advanced and receded position with respect to the structure, a forward rotation of said sliding block motorization means and limb corresponding to limb movement toward said forward end of said machine and a backward rotation of said sliding block motorization means and limb corresponding to a limb movement toward said rearward end of said machine;

control means interfaced with each of said motorization means of the respective constrained ends of the limbs and with said respective motorization means of the sliding blocks, said control means causing said limbs to interact with each other, thereby controlling an advancing of the machine on the surface, said advancing occurring with the lifting and the forward rotation of three limbs alternatively placed on the two sides of the machine, while the remaining three limbs sustain the machine on the surface while being simultaneously rotated backwards with respect to the machine.

4. The machine of claim 3, wherein said frame includes a motorized screw supported by the frame itself, and a dragging element elicoidally coupled to said motorized screw, said support slidably mounted to said slideway and connected to said dragging element, said support bi-directionally mobile along the frame, thus determining the lifting and the lowering of the limbs with respect to the surface.

5. The machine of claim 3, wherein said frames are mounted onto said bearing structure and revolve about an axis parallel to said surface, said machine including a motorized frame which controls the inclination of said limbs which is rotatingly interconnected to each said frame for the lifting and the lowering of the limbs, said frame for the control of the inclination being slidably mounted onto said bearing structure so as to result alternatively and longitudinally mobile with respect to said bearing structure in such a way as to oscillate said frames about said axes and so inclinating said limbs with respect to the bearing structure permitting the machine to move on inclined surfaces maintaining the limbs substantially vertical.

6. The machine of claim 5, wherein said motorized frame has at least one connecting link between said lifting and lowering frame and said inclination frame for the limbs.

7. A machine for arthropod locomotion on a surface, said machine having a longitudinal axis and forward and rearward ends, said machine comprising:

a bearing structure generally disposed along said longitudinal axis and having a pair of sides;

at least six limbs for supporting the structure on the surface, each limb having a free end and a constrained end, each constrained end centrally and spherically hinged on a respective sliding block, each respective sliding block mounted on a respective longitudinal slideway supported by said structure, a each free end is capable of interacting with the surface, and each constrained end is rotatable and slidable with respect to the machine along a respective limb vertical axis;

motorization means coupled to each of said constrained limb ends for lifting and lowering the free ends of each said limb with respect to the surface;

motorization means coupled with the sliding blocks of each said slideway so as to respectively rotate each limb about said limb vertical axis and to move said limb between a longitudinally advanced and receded position with respect to the structure, a forward rotation of said sliding block motorization means and limb corresponding to limb movement toward said forward end of said machine and a backward rotation of said sliding block motorization means and limb corresponding to a limb movement toward said rearward end of said machine, wherein said motorization means of each said sliding block respectively including a feed frame slidably mounted to said bearing structure, said feed frame directly connected to said sliding blocks on a first group of three limbs, two limbs of said first group longitudinally disposed from each other on one side of said machine and a third limb of said first group disposed on the other side of said machine, relatively between said two limbs of said first group, said feed frame indirectly connected to said sliding blocks on a second group of three limbs by means of an interposed reversing mechanism, two limbs of said second group of three limbs longitudinally disposed on said same side of said machine as said one limb of said first group, with said one limb of said first group disposed between said two limbs, a third limb of said second group arranged on said same side of said machine as said two limbs of said first group and is disposed therebetween, each said feed frame including a motor for alternatively translating said feed frame in a direction longitudinally along said bearing structure of said machine, said translation determining an advancement of said first group of three limbs and indirectly determining a recision of said second group of three limbs relative to each other;

control means interfaced with each of said motorization means of the respective constrained ends of the limbs and with said respective motorization means of the sliding blocks, said control means causing said limbs to interact with each other, thereby controlling an advancing of the machine on the surface, said advancing occurring with the lifting and the forward rotation of three limbs alternatively placed on the two sides of the machine, while the remaining three limbs sustain the machine on the surface while being simultaneously rotated backwards with respect to the machine.

8. The machine of claim 7, wherein at least one of said reversing mechanisms includes a support sustained by said structure, said support including at least two idle pulleys, about which a flexible element is ringwound, said flexible element comprising a first and a second branch, said first branch of said flexible element being connected to said feed frame, said second opposite branch being connected to said sliding block wherein an advancing of the feed frame corresponds with a receding of said sliding blocks.

9. A machine for arthropod locomotion on a surface, said machine having a longitudinal axis and a forward and rearward ends, said machine comprising:

a bearing structure generally disposed along said longitudinal axis and having a pair of sides;

at least six limbs for supporting the structure on the surface, each limb having a free end and a constrained end, each constrained end centrally and spherically hinged on a respective sliding block, each respective sliding block mounted on a respective longitudinal slideway supported by said structure wherein each free end is capable of interacting with the surface, and each constrained end is rotatable and slidable with respect to the machine along a respective limb vertical axis;

motorization means coupled to each of said constrained limb ends for lifting and lowering the free ends of each said limb with respect to the surface;

motorization means coupled with the sliding blocks of said slideway so as to respectively rotate each limb about said limb vertical axis and to move said limb between a longitudinally advanced and receded position with respect to the structure, a forward rotation of said sliding block motorization means and limb corresponding to limb movement toward said forward end of said machine and a backward rotation of said sliding block motorization means and limb corresponding to a limb movement toward said rearward end of said machine;

control means interfaced with each of said motorization means of the respective constrained ends of the limbs and with said respective motorization means of the sliding blocks, said control means causing said limbs to interact with each other, thereby controlling an advancing of the machine on the surface, said advancing occurring with the lifting and the forward rotation of three limbs alternatively placed on the two sides of the machine, while the remaining three limbs sustain the machine on the surface while being simultaneously rotated backwards with respect to the machine, said control means including a plurality of sensors for each limb, wherein at least one sensor is for sensing contact made with said surface, two sensors are for signalling a vertical run of each limb, and one sensor is for signalling collisions with objects that hinder the advancing of the machine.

10. The machine of claim 9, wherein said sensors are push button electric switches.

11. A machine for arthropod locomotion on a surface, said machine having a longitudinal axis and forward and rearward ends, said machine comprising:

a bearing structure generally disposed along said longitudinal axis and having a pair of sides;

at least six limbs for supporting the structure on the surface, each limb having a free end and a constrained end, each constrained end centrally and spherically hinged on a respective sliding block, each respective sliding block mounted on a respective longitudinal slideway supported by said structure wherein each free end is capable of interacting with the surface, and each constrained end is rotatable and slidable with respect to the machine along a respective limb vertical axis;

motorization means coupled to each of said constrained limb ends for lifting and lowering the free ends of each said limb with respect to the surface;

motorization means coupled with the sliding blocks of said slideway so as to respectively rotate each limb about said limb vertical axis so as to move said limb between a longitudinally advanced and receded position with respect to the structure, a forward rotation of said sliding block motorization means and limb corresponding to limb movement toward said forward end of said machine and a backward rotation of said sliding block motorization means and limb corresponding to a limb movement toward said rearward end of said machine;

actuator means for the rotation of the machine on said surface, a respective said actuator means coupled to each of a triad of limbs placed alternatively on the two sides of the machine, said actuator means in phase synchronization with said motorization means of said sliding blocks in order to simultaneously rotate said triad of limbs about their respective vertical axes while the other three limbs are raised from the surface, said actuator means comprised of four-bar linkage supports having articulated elements that are connected to said structure and which are parallely mobile with respect to said surface, each of said four-bar linkage supports having a respective driven element connected to a respective slide block, wherein each of said driven elements is movable in phase synchronism to create a simultaneous rotation of said triad of limbs about a barycentric axis of said machine, orthogonal to a surface of said triad of limbs;

control means interfaced with each of said motorization means of the respective constrained ends of the limbs and with said respective motorization means of the sliding blocks, said control means causing said limbs to interact with each other, thereby controlling an advancing of the machine on the surface, said advancing occurring with the lifting and the forward rotation of three limbs alternatively placed on the two sides of the machine, while the remaining three limbs sustain the machine on the surface while being simultaneously rotated backwards with respect to the machine.

12. The machine of claim 11, wherein said actuator means includes a motorized flexible element and pulleys constrained to said driving elements of the four-bar linkage supports, said flexible element ringwound about said pulleys.

* * * * *